(No Model.)
J. F. KELLY & C. C. CHESNEY.
SYSTEM OF ELECTRICAL DISTRIBUTION.
No. 571,270. Patented Nov. 10, 1896.
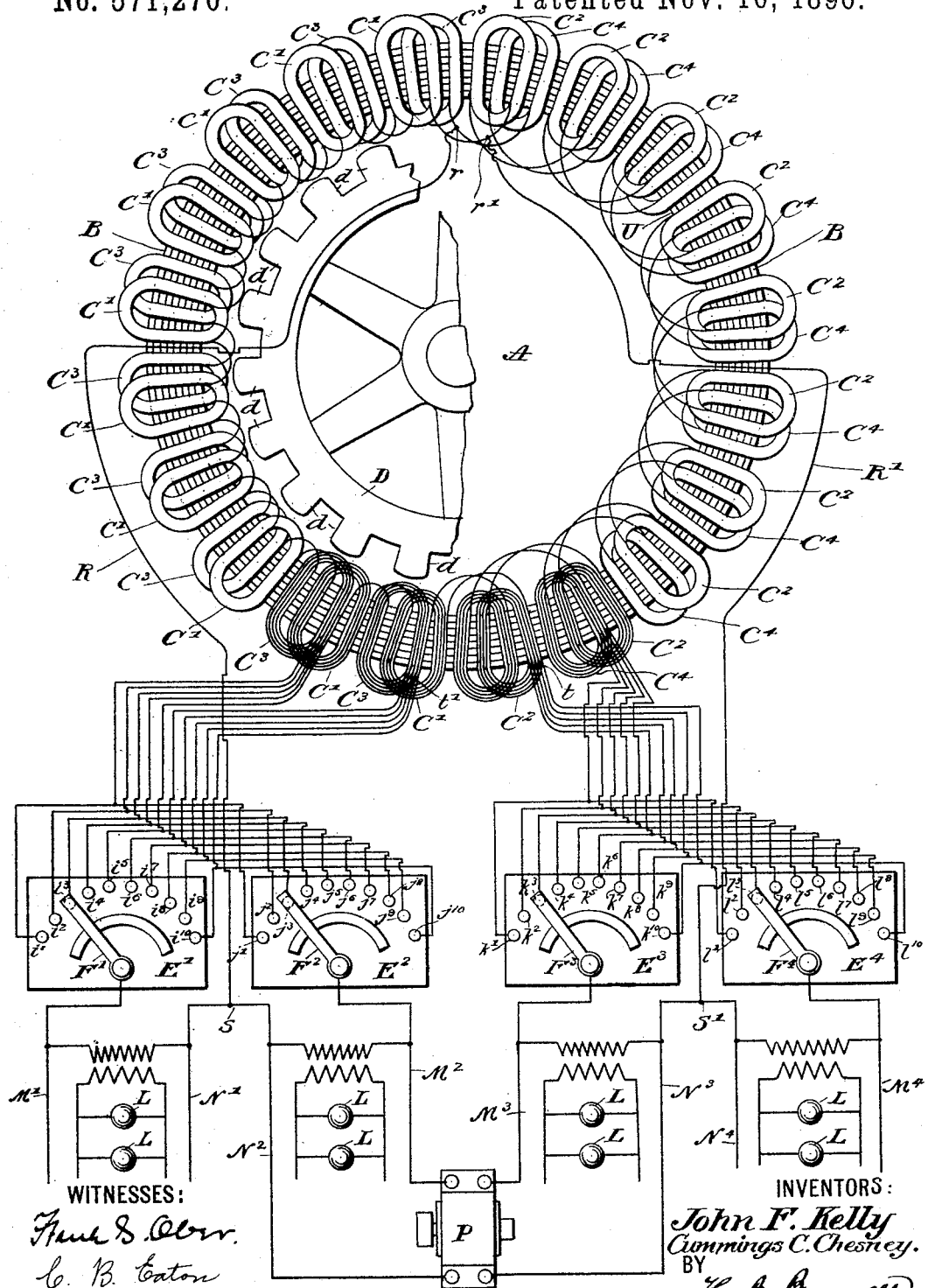
WITNESSES:
Frank S. Obrr.
C. B. Eaton
INVENTORS:
John F. Kelly
Cummings C. Chesney.
BY
H. A. Brownell
ATTORNEY
THE NORRIS PETERS CO., PHOTO-LITHO., WASHINGTON, D. C.

UNITED STATES PATENT OFFICE.

JOHN F. KELLY AND CUMMINGS C. CHESNEY, OF PITTSFIELD, MASSACHUSETTS, ASSIGNORS TO THE STANLEY ELECTRIC MANUFACTURING COMPANY, OF SAME PLACE.

SYSTEM OF ELECTRICAL DISTRIBUTION.

SPECIFICATION forming part of Letters Patent No. 571,270, dated November 10, 1896.

Application filed July 30, 1896. Serial No. 601,073. (No model.)

*To all whom it may concern:*

Be it known that we, JOHN F. KELLY and CUMMINGS C. CHESNEY, citizens of the United States, residing at Pittsfield, in the county of Berkshire and State of Massachusetts, have invented certain new and useful Improvements in Systems of Electrical Distribution, of which the following is a specification.

The object of our invention is to provide an improved system of electrical distribution in which the electromotive force of the current or currents in the line or lines can be varied so as to make up for line losses and the like without affecting a common magnetic field of the generator or the system as a whole.

The following is a description of a system embodying our invention, reference being had to the accompanying drawing.

The drawing represents diagrammatically a system of electrical distribution having four circuits containing translating devices and consisting of two sets of two circuits each, the sets being of different phase and all the circuits being independently controllable.

In the embodiment of our invention shown in the drawing, D represents a revolving inductor broken away in part for the sake of clearness. This inductor is energized in the well-known way, so that its polar projections $d\ d$, lying in a circle surrounding its axis, are of the same polarity.

$C'\ C^2\ C^3\ C^4$ represent armature-coils supported by the armature-core U, which is a cylindrical ring with the coils mounted on its inner surface, so that as the polar projections $d\ d$ revolve they pass over or in front of a coil and direct the lines of force through them in the well-known manner.

$C'$ and $C^2$ represent coils of two groups of armature-coils belonging to the same phase together, equal in number to that of the polar projections $d\ d$. Of these coils those marked $C'$ have their electromotive forces in series, as also do those marked $C^2$. The groups of coils marked $C'$ and the group marked $C^2$ are connected at the point $r'$ and at point $t$ diametrically opposite, so that at those points their electromotive forces are in opposition. From the point $r'$ a conductor $R'$ leads to the point of junction $S'$ of the returns $N^3\ N^4$ of two work-circuits, and from the diametrically opposite point $t$ a conductor leads to a bus-bar connected to the terminals $k^{10}$ and $l^{10}$ on the circuit-controllers $E^3$ and $E^4$, respectively. The last two coils of the group of coils marked $C^2$, in which the windings are shown in detail, are tapped at various points, which successive points are connected by conductors to successive terminals $k^9$ to $k'$, inclusive, and $l^9$ to $l'$, inclusive, on the circuit-controllers $E^3$ and $E^4$, respectively. The switch-arms $F^3$ and $F^4$ of the circuit-controllers are connected with the outgoing members $M^3$ and $M^4$ of the work-circuits.

$C^3$ and $C^4$ represent the coils of two other groups of armature-coils belonging to the same phase as each other, which differs from the phase to which the coils $C'$ and $C^2$ belong by ninety degrees. The coils marked $C^3$ and $C^4$ also equal in number that of the polar projections $d\ d$. Of these coils those marked $C^3$ have their electromotive forces in series, as also do those marked $C^4$. The group of coils marked $C^3$ and the group marked $C^4$ are connected at the point $r$ and at the point $t'$, diametrically opposite, so that at these points their electromotive forces are in opposition. From the point $r$ a conductor R leads to the point of junction S of the returns $N'\ N^2$ of the two work-circuits, and from the diametrically opposite point $t'$ a conductor leads to a bus-bar connected to the terminals $l^{10}$ and $j^{10}$ on the circuit-controllers $E'$ and $E^2$, respectively. The last two coils, the coils of the groups of coils marked $C^3$, in which the windings are shown in detail, are tapped at various points, which successive points are connected by conductors to successive terminals $i^9$ to $i'$, inclusive, and $j^9$ to $j'$, inclusive, on the circuit-controllers $E'$ and $E^2$, respectively. The switch-arms $F'$ and $F^2$ of the circuit-controllers are connected with the outgoing members $M'$ and $M^2$ of the work-circuits. The work-circuits $M'\ N'$, $M^2\ N^2$, $M^3\ N^3$, and $M^4\ N^4$, respectively, supply electrical energy to translating devices L L, either directly or through transformers, as shown. The circuits $M^2\ N^2$ and $M^3\ N^3$ are connected to the coils of a two-phase motor P, and supply electrical energy to be converted into mechanical energy.

From the above it will be seen that if the switch-arms of the circuit-controllers are respectively upon the terminals marked $l^{10}$ $j^{10}$ $k^{10}$ $l^{10}$ the full electromotive force of the coils is impressed upon each of the respective work-circuits. If, however, any of the switch-arms $F'$ $F^2$ $F^3$ $F^4$ is moved onto some other terminal, the electromotive force of the work-circuit controlled thereby is reduced, since, so far as that work-circuit is concerned, the electromotive force of part of the windings of the tapped coils connected with the terminals of that particular circuit-controller is thereby cut out, so as to no longer be in series with the electromotive force of the rest of the windings of its group, and is put in opposition to the electromotive force of the windings of the other group. The arrangement and construction therefore permit an independent variation of the electromotive force impressed on the various work-circuits sufficient to make up for any drop in potential due to the line loss, and that, too, without in any way affecting the magnetic field of the generator or the system as a whole.

It will be observed that the above system is an embodiment of an arrangement wherein there are two work-circuits of different phase, either of which can be varied as to its potential without affecting the other or the magnetic field common to them both. This feature of our invention is independent of any particular or peculiar connection or arrangement of the generating-coils, although the above accompanying drawing shows one embodiment of it. The two-phase motor P is supplied by currents of different phase from the work-circuits $M^2$ $N^2$ and $M^3$ $N^3$, which at the same time supply translating devices L L in parallel arrangement. Disregarding, for the purpose of considering this particular feature, the presence of the work-circuits $M'$ $N'$ and $M^4$ $N^4$, it will be seen that any change in the condition of the translating devices L L in one of the work-circuits $M^2$ $N^2$ and $M^3$ $N^3$ will affect the potential of the current in that circuit and render the currents supplied to the motor unbalanced, and that, by moving the switch-arm of the circuit-controller of the affected circuit to the proper contact, the balance can be restored.

What we claim as our invention, and desire to secure by Letters Patent, is—

1. In a system of electrical distribution, an alternating-current generator having a set of generating-coils consisting of two groups of generating-coils, said groups having their electromotive forces in opposition, said generating-coils consisting of principal generating-coils and regulating generating-coils, the regulating generating-coils being connected to circuit-controllers more than one in number, and each circuit-controller connected to one of as many mains or feeders, and controlling the relation of the regulating generating-coils to the principal generating-coils and the mains or feeders, substantially as described.

2. In a system of electrical distribution a multiphase alternating-current generator having a set of generating-coils for each phase, all energized from the same source of magnetism, each set consisting of principal generating-coils and regulating generating-coils, the regulating generating-coils being connected to one or more circuit-controllers, and each circuit-controller connected to one of as many mains or feeders and controlling the relation of the regulating generating-coils to the principal generating-coils and the mains or feeders, substantially as described.

3. In a system of electrical distribution an alternating-current generator having two sets of generating-coils each being of different phase consisting of two groups of generating-coils, said groups having their electromotive forces in opposition, said generating-coils in each set consisting of principal generating-coils and regulating generating-coils, the regulating generating-coils being connected to one or more circuit-controllers each circuit-controller being connected to one of as many mains or feeders and controlling the relation of the regulating generating-coils to the principal generating-coils and the mains or feeders, substantially as described.

JOHN F. KELLY.
C. C. CHESNEY.

Witnesses:
P. W. POWER,
HENRY L. FRIDENBERG.